(12) United States Patent
Kuribayashi et al.

(10) Patent No.: US 8,183,754 B2
(45) Date of Patent: May 22, 2012

(54) ALUMINA-BASED SINTERED BODY FOR SPARK PLUG AND METHOD OF MANUFACTURING THE SAME, AND SPARK PLUG AND METHOD OF MANUFACTURING THE SAME

(75) Inventors: Makoto Kuribayashi, Aichi (JP); Hironori Uegaki, Aichi (JP); Toshitaka Honda, Aichi (JP); Hirokazu Kurono, Aichi (JP)

(73) Assignee: NGK Spark Plug Co., Ltd. (JP)

( * ) Notice: Subject to any disclaimer, the term of this patent is extended or adjusted under 35 U.S.C. 154(b) by 153 days.

(21) Appl. No.: 12/606,424

(22) Filed: Oct. 27, 2009

(65) Prior Publication Data
US 2010/0148653 A1     Jun. 17, 2010

(30) Foreign Application Priority Data

Oct. 30, 2008   (JP) ................................. 2008-280415
Oct. 23, 2009   (JP) ................................. 2009-244584

(51) Int. Cl.
*H01T 13/02*     (2006.01)
*H01T 21/02*     (2006.01)
*C04B 35/10*     (2006.01)
*C04B 35/04*     (2006.01)
*C04B 35/14*     (2006.01)
*C04B 35/03*     (2006.01)

(52) U.S. Cl. ........ 313/118; 501/127; 501/128; 501/129; 445/7

(58) Field of Classification Search .......... 313/118–145; 123/169 R, 169 EL, 32, 41, 310; 501/125, 501/127–128
See application file for complete search history.

(56) References Cited

U.S. PATENT DOCUMENTS

| 2006/0035778 A1* | 2/2006 | Tomita ........................... 501/141 |
| 2006/0186780 A1 | 8/2006 | Ogata et al. ................... 313/118 |
| 2007/0298245 A1 | 12/2007 | Ogata et al. ................... 428/329 |
| 2008/0309388 A1 | 12/2008 | Hashimoto et al. ........... 327/161 |

FOREIGN PATENT DOCUMENTS

| JP | 2207475 | 8/1990 |
| JP | 2001002465 | 1/2001 |
| JP | 2001335360 | 12/2001 |
| JP | 2008-24583 | 2/2008 |
| WO | WO2005/033041 | 4/2005 |

OTHER PUBLICATIONS

Office Action mailed on Sep. 17, 2010 issued by the Japanese Patent Office from corresponding Japanese Patent Application No. 2009-244584, together with its English translation. 6 pages.

* cited by examiner

*Primary Examiner* — Tracie Green
(74) *Attorney, Agent, or Firm* — Kusner & Jaffe

(57) ABSTRACT

An alumina-based sintered body for a spark plug having enhanced mechanical strength and a method of manufacturing the same, as well as a spark plug having the alumina-based sintered body for a spark plug and a method of manufacturing the same.

9 Claims, 4 Drawing Sheets (a)

(b)

(a)

(b)

F I G. 5
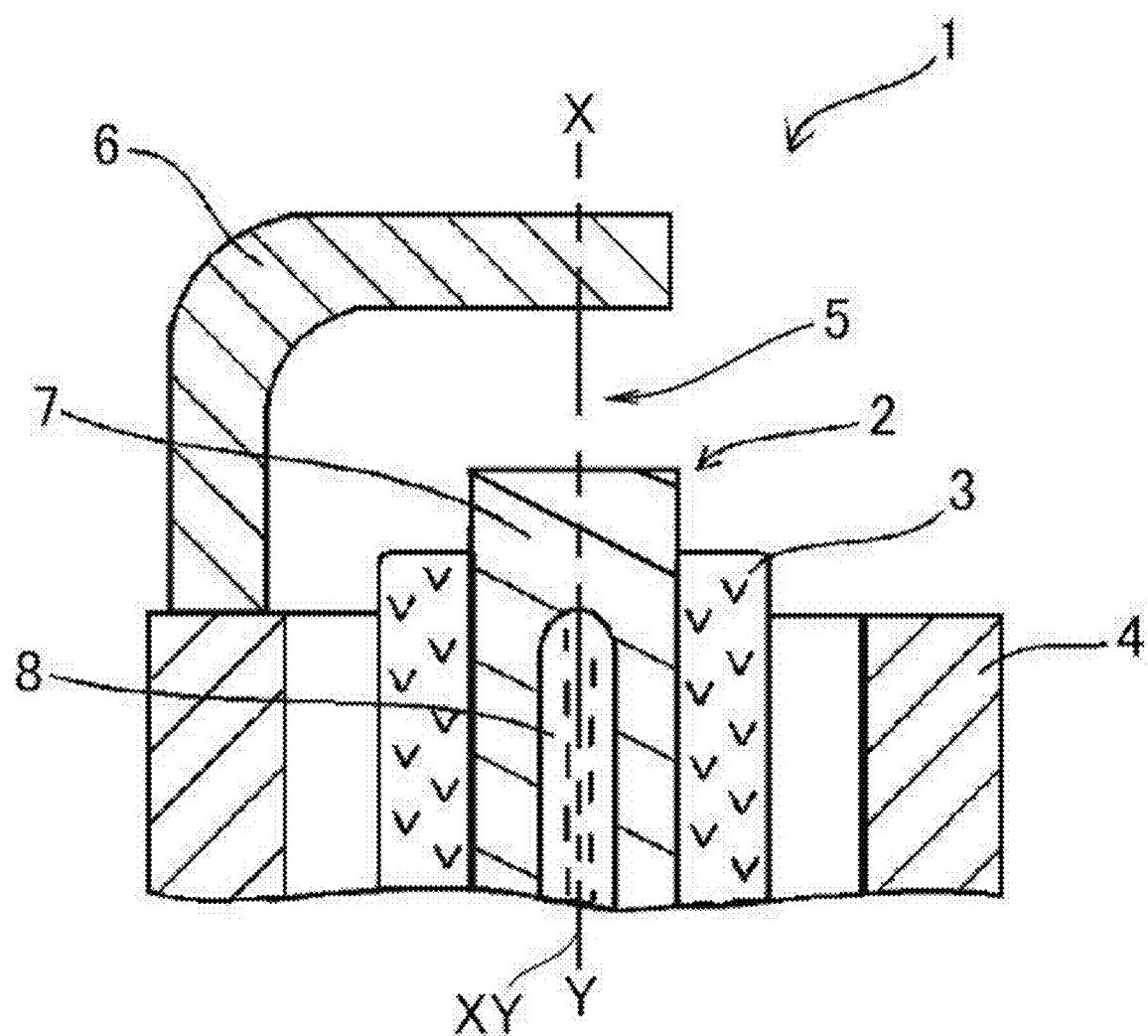

ALUMINA-BASED SINTERED BODY FOR SPARK PLUG AND METHOD OF MANUFACTURING THE SAME, AND SPARK PLUG AND METHOD OF MANUFACTURING THE SAME

FIELD OF THE INVENTION

The present invention relates to an alumina-based sintered body for a spark plug and a method of manufacturing the same, and to a spark plug and a method of manufacturing the same, and more particularly, to an alumina-based sintered body for a spark plug having high mechanical strength and a method of manufacturing the same, as well as to a spark plug having the alumina-based sintered body for a spark plug and a method of manufacturing the same.

BACKGROUND OF THE INVENTION

Japanese Patent Application Laid-Open (kokai) No. 2-207475 describes "a spark plug for an engine configured such that a center electrode and a ground electrode are electrically insulated from each other by means of an insulator, and characterized in that a main insulator formed from silicon nitride ($Si_3N_4$) or mullite ($3Al_2O_3.2SiO_2$) surrounds the center electrode, and an insulator formed from aluminum oxide ($Al_2O_3$) is provided on an inner circumferential surface of the ground electrode" (see claim 1 of Japanese Patent Application Laid-Open (kokai) No. 2-207475).

Japanese Patent Application Laid-Open (kokai) No. 2001-2465 describes "an insulator for a spark plug which contains alumina ($Al_2O_3$) as a main component and at least two components of a trinary system containing a silicon component, a calcium component, and a magnesium component, characterized by having at least a crystalline phase of mullite ($Al_6Si_2O_{13}$) and being formed from an alumina-based sintered body having a relative density of 95% or higher" (see claim 1 of Japanese Patent Application Laid-Open (kokai) No. 2001-2465).

According to the invention described in Japanese Patent Application Laid-Open (kokai) No. 2-207475, the spark plug has high resistance to thermal shock and sufficient dielectric breakdown voltage (see the section "Object of the Invention" in Japanese Patent Application Laid-Open (kokai) No. 2-207475).

According to the invention described in Japanese Patent Application Laid-Open (kokai) No. 2001-2465, the insulator exhibits excellent dielectric strength in a temperature range of room temperature to high temperature and is densified. (See paragraph 0010 of Japanese Patent Application Laid-Open (kokai) No. 2001-2465).

The presence of a crystalline phase in a sintered body improves mechanical strength. By contrast, the presence of aggregates stemming from a failure to achieve densification lowers mechanical strength. Since the insulator for a spark plug is formed through liquid phase sintering, usually, a sintering aid is added in an amount of about 2 mass % to 10 mass %. However, since the size of aggregates is large, a portion of sintering aid that remains unmolten and compounds produced through reaction remain in the form of a non-vitreous substance. Since these residual substances are not in crystalline phase, the insulator for a spark plug formed through liquid-phase sintering involves a problem of deterioration in mechanical strength.

SUMMARY OF THE INVENTION

Advantages of the present invention are an alumina-based sintered body for a spark plug having enhanced mechanical strength and a method of manufacturing the same, as well as a spark plug having an alumina-based sintered body for a spark plug and a method of manufacturing the same.

The alumina-based sintered body for a spark plug according to the present invention, contains alumina, a rare earth element oxide, and an oxide of the same metal as that contained in a sintering aid, wherein the alumina-based sintered body contains alumina in an amount of 90 mass % to 98 mass %, and the rare earth element oxide in an amount of 0.2 mass % to 4 mass %, the balance being the oxide of the same metal as that contained in the sintering aid, and a non-vitreous substance present in the grain boundary has an average grain size of 5 μm or less and a greatest grain size of 10 μm or less. Notably, the sum of the alumina content, the rare earth element oxide content, and the balance is 100 mass %.

In a preferred embodiment of the alumina-based sintered body for a spark plug, the non-vitreous substance present in the grain boundary has an average grain size of 0.2 μm to 5 μm. In the preferred embodiment of the alumina-based sintered body for a spark plug, the non-vitreous substance contains at least a magnesium component. In the preferred embodiment of the alumina-based sintered body for a spark plug, the rare earth element oxide is a lanthanoid oxide, and the oxide of the same metal as that contained in the sintering aid is an oxide of at least one metal selected from the group consisting of silicon, calcium, magnesium, and barium.

In accordance with one aspect of the present invention, there is provided a spark plug comprising an alumina-based sintered body for a spark plug as recited in the attached claims 1 to 4 and formed into a cylindrical body, a center electrode assembled into the cylindrical body, and a cylindrical metallic shell having the alumina-based sintered body for a spark plug attached thereto.

In accordance with another aspect of the present invention, there is provided a method of manufacturing an alumina-based sintered body for a spark plug in which a non-vitreous substance present in the grain boundary has an average grain size of 0.2 μm to 5 μm. The method comprises sintering a mixture which contains alumina in an amount of 90 mass % to 98 mass %, and a rare earth element oxide in an amount of 0.2 mass % to 4 mass %, the balance being a sintering aid having an average particle size of 0.5 μm≦D50≦2 μm.

In accordance with a still further aspect of the present invention, there is provided a method of manufacturing an alumina-based sintered body for a spark plug in which a non-vitreous substance contains at least magnesium oxide. The method comprises sintering a green compact which contains alumina in an amount of 90 mass % to 98 mass %, and a rare earth element oxide having an average particle size of 0.5 μm≦D50≦2 μm in an amount of 0.2 mass % to 4 mass %, the balance being a sintering aid containing at least a magnesium compound and having an average particle size of 0.5 μm≦D50≦2 μm such that the sum of alumina content, the rare earth element oxide content, and the balance is adjusted to 100 mass %.

In accordance with another aspect of the present invention, there is provided a method of manufacturing a spark plug according to claim 5. The method comprises firing to sinter the green compact for forming an alumina-based sintered body for a spark plug in the form of a substantially cylindrical body; a assembling the center electrode into the substantially cylindrical body of the alumina-based sintered body for a spark plug; and attaching the alumina-based sintered body for a spark plug to the metallic shell.

Since the alumina-based sintered body for a spark plug according to the present invention is free from the presence of a non-vitreous substance having a large grain size present in the grain boundary, for example, cracking is unlikely to occur therein, and any cracking is unlikely to progress. Thus, the present invention can provide an alumina-based sintered body for a spark plug having high mechanical strength. Also, the present invention can provide a method of efficiently manufacturing an alumina-based sintered body for a spark plug having excellent mechanical strength. Further, the present invention can provide a spark plug which includes an alumina-based sintered body for a spark plug having high mechanical strength. The present invention can provide a method of efficiently manufacturing the above-mentioned spark plug.

BRIEF DESCRIPTION OF THE DRAWINGS

FIGS. 1(a) and 1(b) are views showing the compositional images of alumina-based sintered bodies for a spark plug obtained through EDS analysis, wherein FIG. 1(a) shows the surface of an alumina-based sintered body for a spark plug which is not of the present invention, and FIG. 1(b) shows the surface of an example alumina-based sintered body for a spark plug according to the present invention.

FIGS. 2(a) and 2(b) are views showing the compositional images of alumina-based sintered bodies for a spark plug observed through SEM, wherein FIG. 2(a) shows the surface of the alumina-based sintered body for a spark plug which is not of the present invention, and FIG. 2(b) shows the surface of the example alumina-based sintered body for a spark plug according to the present invention.

FIG. 5 is an enlarged partial view of FIG. 4.

DETAILED DESCRIPTION OF PREFERRED EMBODIMENTS

Figure 1:
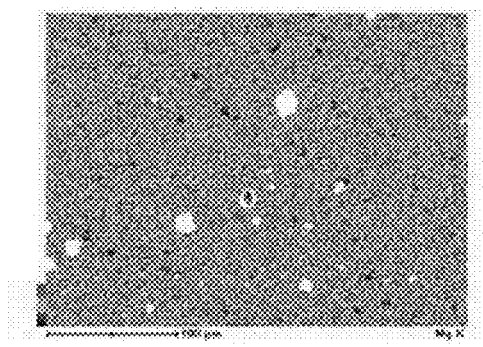
Figure 1:
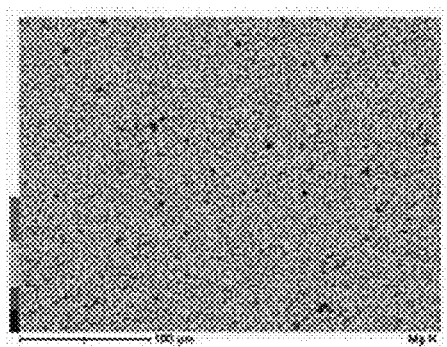

An alumina-based sintered body for a spark plug according to the present invention contains alumina, a rare earth element oxide, and an oxide of the same metal as that contained in a sintering aid.

The alumina-based sintered body for a spark plug according to the present invention (hereinafter may be referred to simply as the "sintered body") contains alumina in an amount of 90 mass % to 98 mass % and a rare earth element oxide in an amount of 0.2 mass % to 4 mass %, the balance being an oxide of the same metal as that contained in a sintering aid.

Preferably, the average grain size of alumina ($Al_2O_3$) contained in the sintered body is 1 μm to 5 μm. This is because a sintered body which contains alumina having such an average grain size can be formed through sintering at low temperature, and the sintering aid content can be reduced. Thus, in manufacture of the sintered body, it is preferred to avoid using, as material, alumina whose particle size is such that a grain size after sintering becomes less than 1 μm. The reason for this is as follows: using alumina having such a particle size can achieve an object of the present invention, but involves an increased possibility of clogging of a grindstone when a compact, formed by use of a press as will be described later, is shape-formed by means of polishing with the grindstone before sintering. In other words, the sintered body which contains alumina having an average grain size of 1 μm to 5 μm can be readily manufactured through low-temperature sintering; can be manufactured with a reduced a sintering aid content; and can be efficiently manufactured from a compact which is shape-formed, before sintering, without involvement of clogging of a grindstone in the course of shape-forming.

When the alumina content of the sintered body is 90 mass % to 98 mass %, preferably 92 mass % to 96 mass %, the alumina-based sintered body for a spark plug according to the present invention has high density. Since the high-density alumina-based sintered body for a spark plug is unlikely to suffer generation of residual pores present in the grain boundary, cracking, which could result in a drop in mechanical strength, is unlikely to occur in the interior and on the exterior of the sintered body. Notably, the alumina content of the alumina-based sintered body for a spark plug according to the present invention is expressed in mass % as reduced to an oxide of aluminum contained in the sintered body.

The rare earth element oxide is an oxide of a rare-earth element; i.e., the lanthanoid elements consisting of lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu); scandium (Sc); or yttrium (Y). The material used to form a rare earth element oxide present in the sintered body may be a compound which forms a rare earth element oxide through sintering; thus, the material is not necessarily a rare earth element oxide. Preferably, a material rare earth element oxide, or a material compound which will become a rare earth element oxide through sintering, has a particle size of 0.5 μm to 3 μm, since the alumina-based sintered body for a spark plug according to the present invention can be densified.

The sintered body having a rare earth element oxide content of 0.2 mass % to 4 mass % contains alumina of uniform grain size and has very small amounts of alumina grains having an abnormal length. When the rare earth element oxide content is less than 0.2 mass %, alumina contained in the sintered body may fail to have uniform grain size. When the rare earth element oxide content is in excess of 4 mass %, the sintered body may deteriorate in sinterability; in other words, the sintered body may become fragile. The rare earth element oxide content is expressed in mass % as reduced to an oxide of a rare-earth element contained in the sintered body. Specifically, in the case of a rare-earth element of praseodymium (Pr), the rare earth element oxide content is expressed in mass % as reduced to praseodymium oxide ($Pr_6O_{11}$). In the case where a rare-earth element other than Pr is contained in the sintered body, the rare earth element oxide content is expressed in mass % as reduced to a rare earth element oxide ($RE_2O_3$).

Generally speaking, since a material powder mixture to be sintered which contains alumina and a rare earth element oxide encounters difficulty in sintering at low temperature, high sintering temperature must be employed for sintering the material mixture. In order to obtain a dense sintered body having high mechanical strength from a material mixture to be sintered which contains alumina and a rare earth element oxide, by means of favorably performing a sintering operation at relatively low temperature, the addition of a sintering aid to the material powder mixture to be sintered is essential. In the present invention, a sintering aid functions to lower the sintering temperature for alumina ceramics.

No particular limitation is imposed on the sintering aid added as material, so long as the sintering aid is a compound which is unlikely to produce non-vitreous substance having large grain size through reaction with alumina. A magnesium (Mg) compound, a silicon (Si) compound, a calcium (Ca) compound, and/or a barium (Ba) compound, etc. can be used as the sintering aid. The sintering aid added as one of the materials mostly melts through sintering and is present in the form of a glassy substance present in the grain boundary of a sintered body yielded through sintering. The sintering aid added as material is not necessarily an oxide. For example, the sintering aid may be a carbonate, such as magnesium carbonate ($MgCO_3$), or a sulfate, such as magnesium sulfate ($MgSO_4$). Hereinafter, the sintering aid content of the sintered body is expressed in mass % as reduced to oxide. Preferably, the sintering aid added as material has an average particle size D50 of 0.5 μm to 2 μm, since the grain growth of alumina progresses uniformly in the course of sintering. When the average particle size D50 of the sintering aid is less than 0.5 μm, workability may deteriorate; for example, the viscosity of slurry, which is a material mixture to be sintered, rises. When the average particle size D50 of the sintering aid is in excess of 2 μm, the sintering aid may fail to completely melt during sintering and consequently remain in the grain boundary in the form of a non-vitreous substance, and also the sintering aid may partially assume the liquid phase during sintering; consequently, abnormal grain growth of alumina is apt to occur. Preferably, the particle size of the sintering aid is smaller than that of alumina, since the densification of the sintered body is likely to progress easily. Notably, the average particle size D50 means a particle size at an integrated value of 50% in particle size distribution.

In ceramics which contain an oxide of the same metal as that contained in the sintering aid, in many cases, a non-vitreous substance is present in the grain boundary. The non-vitreous substance assumes a non-vitreous phase present in the grain boundary and is generated through various reactions of materials during sintering. Examples of the non-vitreous substance include magnesium oxide (MgO), silicon oxide ($SiO_2$), calcium oxide (CaO), barium oxide (BaO), and compounds produced through reaction of the sintering aid with alumina and a rare earth element (e.g., $LaAlO_3$).

When a non-vitreous substance present in the sintered body has a large grain size, conceivably, cracking or the like is apt to occur and progress with the non-vitreous substance serving as a starting point of cracking or the like. Thus, in order to ensure sufficient mechanical strength, the alumina-based sintered body for a spark plug according to the present invention contains, in the grain boundary, a non-vitreous substance having an average grain size of 5 μm or less, particularly an average grain size of 0.2 μm to 5 μm, and a greatest grain size of 10 μm or less. When a non-vitreous substance having such a grain size is contained in the grain boundary, cracking or the like, which could cause breakage of the sintered body, is unlikely to occur with the non-vitreous substance serving as a starting point of cracking or the like; thus, a yielded alumina-based sintered body for a spark plug exhibits excellent mechanical strength. When the alumina-based sintered body for a spark plug according to the present invention has excellent mechanical strength, in the course of use of a spark plug having the sintered body and mounted to an internal combustion engine or the like, the sintered body is unlikely to be broken from vibrations of the internal combustion engine or the like.

When the alumina-based sintered body for a spark plug according to the present invention contains, in the grain boundary, a non-vitreous substance having an average grain size of 0.2 μm to 5 μm and a greatest grain size of 10 μm or less, the alumina-based sintered body becomes denser and higher in mechanical strength.

When a non-vitreous substance having an average grain size of 0.2 μm to 5 μm and a greatest grain size of 10 μm or less is contained in the grain boundary, density and mechanical strength increase for the following reason.

Generally, in the course of sintering, when a sufficient quantity of heat is applied to a material mixture to be sintered, a non-vitreous substance is produced. Restraint of the quantity of heat to be applied may enable manufacture of a sintered body in which a non-vitreous substance is hardly present. However, when the quantity of heat is restrained excessively, the grain growth of alumina is not accelerated. Accordingly, the sintered body fails to be densified, and thus strength may fail to be increased. In order to manufacture a sintered body which is dense and contains little non-vitreous substance, the quantity of heat must be adjusted accurately; for example, the firing temperature must be adjusted with a tolerance of ±5° C. Consequently, the productivity of the sintered body drops.

In a preferred embodiment of the alumina-based sintered body for a spark plug according to the present invention, a non-vitreous substance present in the grain boundary has an average grain size of 0.2 μm to 5 μm and a greatest grain size of 10 μm or less. The alumina-based sintered body for a spark plug in which the average grain size and the greatest grain size of a non-vitreous substance satisfy the above-mentioned respective numerical ranges can be manufactured without need of fine, accurate temperature control in the course of firing. Thus, the manufacture of the alumina-based sintered body for a spark plug of the preferred embodiment can maintain a certain level of productivity. Further, the thus-yielded alumina-based sintered body for a spark plug is dense and exhibits high mechanical strength. Such an alumina-based sintered body for a spark plug can be manufactured from, for example, materials specified in the section "Examples" to be described later; however, the present invention is not limited thereto.

Preferably, the above-mentioned non-vitreous substance contains at least a magnesium component; for example, magnesium oxide and/or a magnesium oxide complex, such as $MgAl_2O_4$. When the glass phase contains a compound deriving from the sintering aid, and a magnesium component, particularly magnesium oxide, in a large amount, the glass phase may drop in softening temperature, so that the high-temperature strength of the sintered body is apt to deteriorate. Thus, in the alumina-based sintered body for spark plug, by means of confining a magnesium component in a non-vitreous substance; in other words, avoiding the presence of a magnesium component, particularly magnesium oxide, in a vitreous substance, the glass phase can maintain high softening temperature. As a result, the alumina-based sintered body for a spark plug according to the present invention can have sufficient high-temperature strength.

Figure 2:
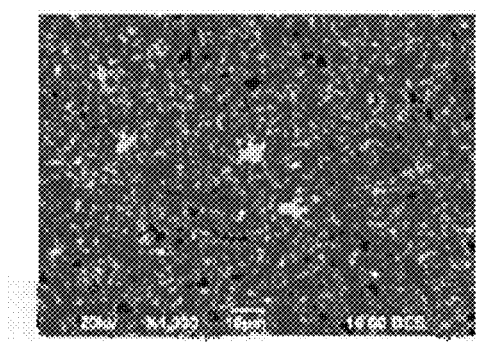
Figure 2:
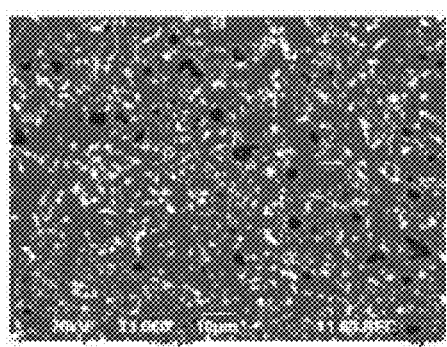

The above-mentioned non-vitreous substance can be identified through X-ray diffraction (XRD), energy-dispersive X-ray spectroscopy (EDS), etc. More specifically, a non-vitreous substance contained in the alumina-based sintered body for a spark plug according to the present invention can be identified by, for example, a method in which the composition of the surface of the sintered body is observed through a scanning electron microscope (SEM) or a method in which the surface of the sintered body is observed through EDS. FIG. 1(a) and FIG. 2(a) show the result of EDS analysis and the result of SEM observation, respectively, with respect to the surface of an alumina-based sintered body for a spark plug manufactured by a method that is different from that of the present invention. FIG. 1(a) shows an image of the surface of the sintered body as analyzed by EDS while an element to be detected is set to magnesium. FIG. 2(a) shows an image of the composition of the surface of the sintered body observed through SEM. In FIGS. 1(a) and 2(a), white agglomerates are of a non-vitreous substance. Since, in the EDS analysis, the element to be detected is set to magnesium, white agglomerates appearing in FIG. 1(a) indicate that magnesium is present in the form of agglomerates of a non-vitreous substance. As will be described later in the section "Examples," FIG. 1(b) and FIG. 2(b) show the result of EDS analysis and the result of SEM observation, respectively, with respect to the surface of an example alumina-based sintered body for a spark plug of the present invention.

Figure 3:
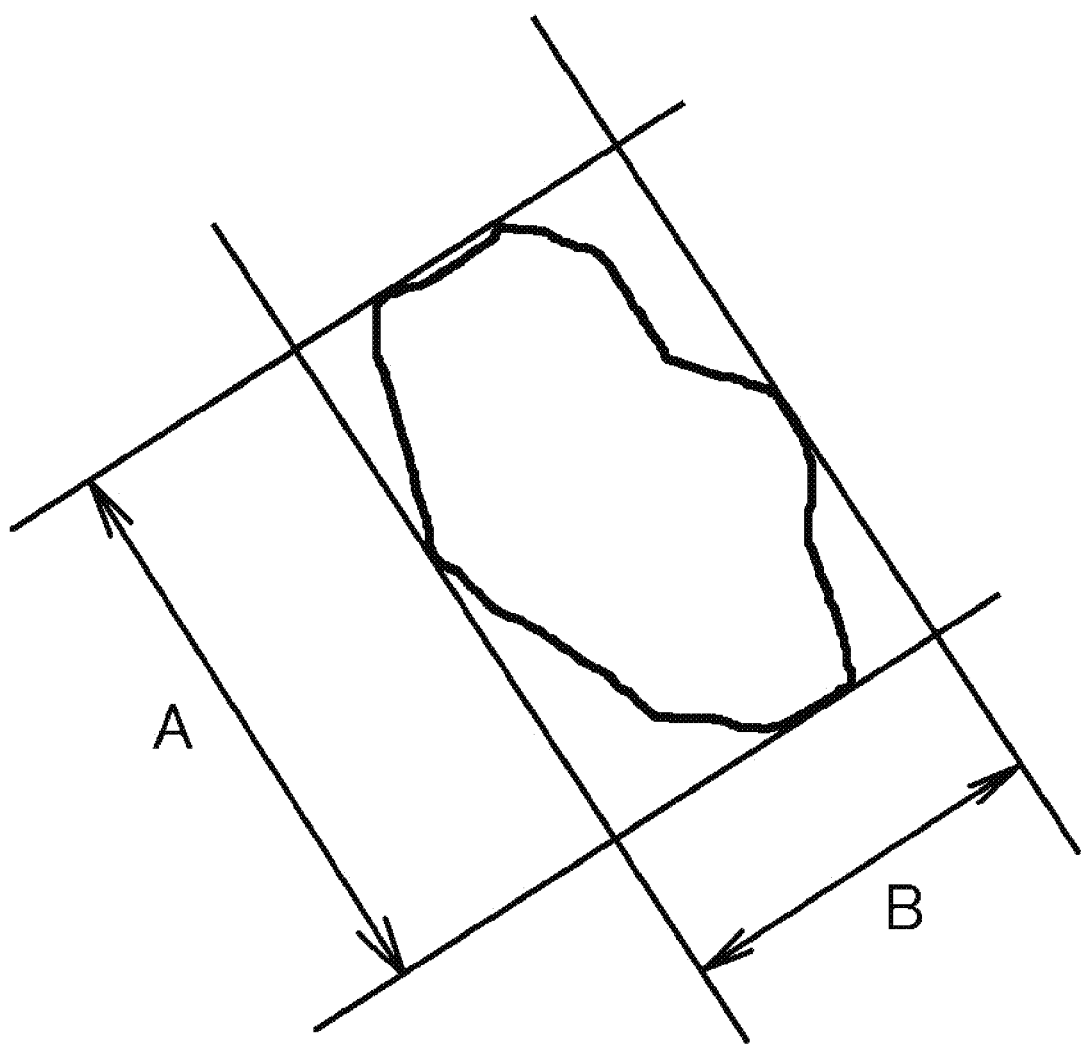
FIG. 3 is a view for explaining a non-vitreous substance.

The grain size of a non-vitreous substance is a maximal grain size of a non-vitreous substance identified by the above-mentioned analysis. As shown in FIG. 3, within a rectangle which surrounds a non-vitreous substance, the grain size of the non-vitreous substance is taken as the length A of a long side, rather than the length B of a short side. The average grain size of a non-vitreous substance is, for example, the average of those grain sizes of a non-vitreous substance which are measured at a plurality of locations of the EDS analysis. The greatest grain size of a non-vitreous substance is defined as the greatest value among those grain sizes of a non-vitreous substance which are measured at the plurality of locations.

An embodiment of the spark plug according to the present invention having the alumina-based sintered body for a spark plug according the present invention will next be described with reference to the drawings.

Figure 4:
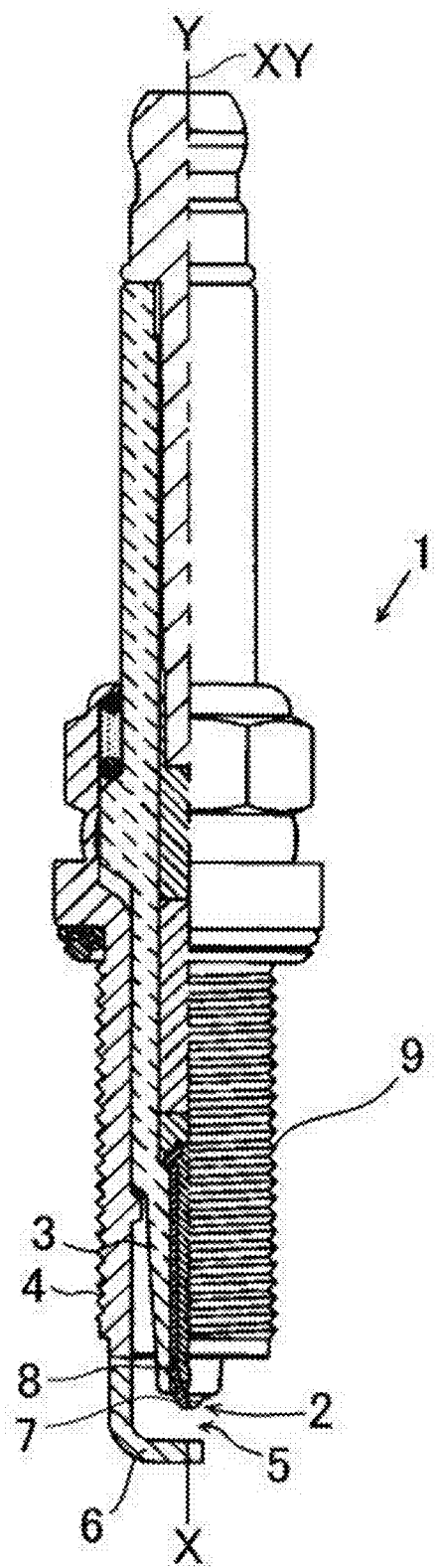
FIG. 4 is a schematic view showing an embodiment of a spark plug using the alumina-based sintered body for a spark plug according to the present invention.

FIG. 4 is an explanatory, partially sectional view showing an entire spark plug 1 according to an embodiment of the present invention. FIG. 5 is an explanatory, sectional view showing essential portions of the spark plug 1 according to the embodiment of the present invention. In the following description, a side toward X of an axis XY in FIGS. 4 and 5 is referred to as the front side of the spark plug 1, and a side toward Y of the axis XY as the rear side of the spark plug 1.

As shown in FIGS. 4 and 5, the spark plug 1 includes a generally rod-like center electrode 2; a substantially cylindrical insulator 3 which surrounds the outer circumference of the center electrode 2; a cylindrical metallic shell 4 into which the insulator 3 is inserted; and a ground electrode 6 whose one end faces the front end surface of the center electrode 2 with a spark discharge gap 5 intervening therebetween and whose other end is joined to an end portion of the metallic shell 4.

The metallic shell 4 assumes the form of a substantially cylindrical body and is formed in such a manner as to fixedly hold the insulator 3 assembled into the substantially cylindrical body. The metallic shell 4 has a threaded portion 9 formed on the outer circumferential surface of a front portion thereof. By use of the threaded portion 9, the spark plug 1 is mounted to a cylinder head of an non-illustrated internal combustion engine. The metallic shell 4 can be formed from an electrically conductive steel material; for example, low-carbon steel.

The insulator 3 is formed from the alumina-based sintered body for a spark plug according to the present invention and assumes the form of a substantially cylindrical body. The insulator 3 is supported by an inner circumferential portion of the metallic shell 4 via talc and/or packing or the like (not shown) and has an axial bore extending along the axis XY thereof and adapted to hold the center electrode 2. The insulator 3 is fixedly attached to the metallic shell 4 in such a manner that a front end portion thereof projects from the front end surface of the metallic shell 4. Since the alumina-based sintered body for a spark plug according to the present invention has excellent mechanical strength, in the course of use of the spark plug 1 mounted to an internal combustion engine, the insulator 3 is less likely to be damaged by vibration or the like of the internal combustion engine.

The center electrode 2 is composed of an outer member 7 and an inner member 8 concentrically embedded in the outer member 7. The center electrode 2 is fixed in the insulator 3 in such a manner that a front end portion thereof projects from the front end surface of the insulator 3 and is electrically insulated from the metallic shell 4. The outer member 7 can be formed from an alloy which predominantly contains nickel (Ni), which is excellent in heat resistance and corrosion resistance. The inner member 8 can be formed form a metallic material having excellent thermal conductivity, such as copper (Cu) or silver (Ag).

The ground electrode 6 is formed into, for example, a rectangular, columnar body. The shape and structure of the ground electrode 6 are design as follows: one end is joined to the end surface of the metallic shell 4; an intermediate portion is bent; and the other end is located on the axis XY. Through employment of such design of the ground electrode 6, one end of the ground electrode 6 faces the center electrode 2 with the spark discharge gap 5 intervening therebetween. The spark discharge gap 5 is formed between the front end surface of the center electrode 2 and a surface of the ground electrode 6 and is usually set to 0.3 mm to 1.5 mm. Since the ground electrode 6 is more likely to be exposed to high temperature than is the center electrode 2, the ground electrode 6 is formed preferably from an Ni alloy or the like which is superior in heat resistance and corrosion resistance to an Ni alloy used to form the center electrode 2.

Next will be described a method of manufacturing the alumina-based sintered body for a spark plug according to the present invention.

The alumina-based sintered body for a spark plug according to the present invention can be manufactured by means of sintering a green compact which contains alumina in an amount of 90 mass % to 98 mass %, a rare earth element oxide in an amount of 0.2 mass % to 4 mass %, and a sintering aid such that the alumina content, the rare earth element oxide content, and the sintering aid content is adjusted to 100 mass %. When the alumina-based sintered body for a spark plug is to be such that a non-vitreous substance having an average grain size of 0.2 μm to 5 μm is present in the grain boundary, the use of a sintering aid having an average particle size of 0.5 μm≦D50≦2 μm is particularly preferred.

All materials used to form a green compact are powders. The average particle size of alumina powder is preferably 0.1 μm to 5 μm in the usual case; the average particle size of a rare earth element oxide is preferably 0.5 μm to 3 μm in the usual case; and the average particle size of a sintering aid is preferably 0.5 μm≦D50≦2 μm in the usual case.

Aluminum (Al) compound powder may be used instead of alumina powder. In order to obtain a dense sintered body, the average particle size of Al compound powder is preferably 0.1 μm to 3.0 μm. The average particle size can be measured by, for example, a laser diffraction method (LA-750, product of HORIBA, Ltd.).

In the method of manufacturing the alumina-based sintered body for a spark plug according to the present invention, the average particle size of a rare earth element oxide is preferably 0.5 μm≦D50≦2 μm. Through use of a rare earth element oxide having an average particle size falling within the numerical range, a non-vitreous substance present in the grain boundary has an average grain size of 0.2 μm to 5 μm as mentioned previously, so that a dense alumina-based sintered body for a spark plug having high strength can be yielded.

In the case of manufacture of an alumina-based sintered body for a spark plug in which a non-vitreous substance contains at least a magnesium component, preferably, a sintering aid to be used contains at least a magnesium compound; for example, magnesium oxide, and has an average particle size of 0.5 μm≦D50≦2 μm.

A rare-earth element (RE) compound powder (hereinafter may be abbreviated as RE compound) can also be used in place of the rare earth element oxide powder. No particular limitation is imposed on an RE compound powder, so long as the compound is converted to a rare earth element oxide (hereinafter may be abbreviated as RE oxide) through firing. An example of the RE compound powder is a powder of a complex oxide of RE oxide. When the RE compound powder is used, the amount of usage is expressed in mass % as reduced to oxide.

Examples of a sintering aid powder include various inorganic compound powders of oxides, hydroxides, carbonates, chlorides, sulfates, nitrates, and phosphates of Mg, Si, Ca, and Ba. Specific examples of a sintering aid powder include MgO powder, $MgCO_3$ powder, $SiO_2$ powder, CaO powder, $CaCO_3$ powder, BaO powder, and $BaCO_3$ powder. When a powder of other than oxide is used as a sintering aid powder, the amount of usage is expressed in mass % as reduced to oxide. Preferred sintering aids are MgO, $SiO_2$, and CaO.

Next, a slurry is formed through dispersion of material in solvent or the like. The slurry is spray-dried by a spray dry process or the like, thereby forming a powder having an average particle size of 50 μm to 200 μm, preferably 70 μm to 150 μm. The average particle size of each of material powders contained in the slurry can be measured by a laser diffraction method (MT-3000, product of Microtrac, Inc). The thus-yielded powder is formed into a green compact (hereinafter may be referred to simply as a compact). The thus-yielded compact is subjected to machining, such as cutting and polishing, as needed so as to assume a desired shape. Subsequently, the compact is fired in the atmosphere at a temperature of 1,400° C. to 1,700° C., more preferably 1,500° C. to 1,600° C., for a time of 1 hour to 8 hours, more preferably 1 hour to 2 hours, whereby a sintered body can be yielded.

The thus-yielded sintered body has excellent mechanical strength, since a non-vitreous substance having a large grain size is unlikely to exist in the grain boundary. Thus, the yielded sintered body; i.e., the alumina-based sintered body for a spark plug according to the present invention, is particularly preferred as an insulator for use in a spark plug for an ordinary internal combustion engine and a spark plug for a high-output internal combustion engine.

The method of manufacturing a spark plug according to the present invention includes firing to sinter a green compact for forming an alumina-based sintered body for a spark plug in the form of a substantially cylindrical body; assembling a center electrode into the substantially cylindrical body of the alumina-based sintered body for a spark plug; and attaching the alumina-based sintered body for a spark plug to the metallic shell.

The green compact contains alumina in an amount of 90 mass % to 98 mass % and a rare earth element oxide in an amount of 0.2 mass % to 4 mass %, the balance being a sintering aid having an average particle size of 0.5 μm≦D50≦2 μm such that the alumina content, the rare earth element oxide content, and the sintering aid content is adjusted to 100 mass %. Alternatively, the green compact contains alumina in an amount of 90 mass % to 98 mass % and a rare earth element oxide having an average particle size of 0.5 μm≦D50≦2 μm in an amount of 0.2 mass % to 4 mass %, the balance being a sintering aid containing at least a magnesium compound, particularly magnesium oxide, and having an average particle size of 0.5 μm≦D50≦2 μm such that the alumina content, the rare earth element oxide content, and the sintering aid content is adjusted to 100 mass %.

An example method of manufacturing the spark plug according to the present invention will next be described by use of reference numerals assigned to the members of the spark plug 1 shown in FIG. 4. Meanwhile, since the firing step in the method of manufacturing the spark plug of the present invention is similar to that in the method of manufacturing the alumina-based sintered body for a spark plug according to the present invention, redundant description thereof is omitted.

First, the members of the spark plug 1 are manufactured. Specifically, an electrode material, such as an Ni-based alloy, is machined so as to assume a predetermined shape, thereby yielding the center electrode 2 and/or the ground electrode 6. Preparation of electrode material and subsequent machining can be continuously conducted. For example, by use of a vacuum melting furnace, a molten metal of an Ni-based alloy or the like having a desired composition is prepared; an ingot is prepared from the molten metal through vacuum casting; the ingot is subjected to hot working, wire drawing, etc.; and a resultant work piece is adjusted to have a predetermined shape and predetermined dimensions, thereby yielding the center electrode 2 and/or the ground electrode 6. The center electrode 2 can also be formed as follows: the inner member 8 is inserted into a cup-shaped outer member 7, and the resultant assembly is subjected to plastic working, such as extrusion.

Next, one end of the ground electrode 6 is joined, by electric resistance welding or the like, to the end surface of the metallic shell 4, which is formed by plastic working or the like so as to have a predetermined shape. The resultant assembly is washed as desired in hydrochloric acid of about 10% and water or the like. Then, in the center electrode assembly step, the center electrode 2 is assembled to the insulator 3 by a known method. Further, in the metallic shell attachment step, the insulator 3 is assembled to the metallic shell 4 to which the ground electrode 6 is joined. Then, a distal end portion of the ground electrode 6 is bent toward the center electrode 2 such that one end of the ground electrode 6 faces a front end portion of the center electrode 2. The spark plug 1 thus is manufactured.

EXAMPLES

A sintering aid of $CaCO_3$ and $MgCO_3$, a rare earth element oxide of $La_2O_3$, clay, and water were charged into a resin pot (2.4 L). By means of alumina balls each having a diameter of 10 mm, solid matter was mixed to pulverize to a predetermined particle size.

The particle size distribution measuring device (Microtrac MT-3000 Series, product of NIKKISO CO., LTD.) was set in refractive index to 1.77, and the average particle size D50 of the sintering aid was measured.

A slurry composed of alumina having an average particle size of 2.5 mm and a sintering aid, and water were measured out at such proportions as to attain the oxide-reduced amounts shown in Table 1 (the amounts of carbonates are reduced to oxide masses). A binder was added to the resultant mixture, thereby forming slurry. The resultant slurry was formed into a powder having an average particle size of 70 μm to 100 μm by a spray dry process. By use of the particle size distribution measuring device (Microtrac MT-3000 Series, product of NIKKISO CO., LTD.), the average particle size of alumina and the average particle size of the yielded powder were measured.

The yielded powder was formed into a compact having a diameter of 23 mm by means of a die and press at 60 MPa. Next, by use of the high-speed heat up electric furnace SUPER BURN (product of Motoyama Co., Ltd.), the compact was fired at a firing temperature of 1,560° C. for 1 hour in the atmosphere, thereby yielding a sintered body. The alumina content, the rare earth element oxide content, and the content of an oxide of the same metal as that contained in the sintering aid in the sintered body are the same as those of materials appearing in Table 1.

measure strength, sintered bodies formed at a firing temperature of 1,560° C. were formed into test pieces each measuring 10 mm×5 mm×500 mm. The test pieces were then subjected to a 3-point bending test with a span of 30 mm.

TABLE 1

| Sample | Sintering aid | | | | | $La_2O_3$ particle size D50 (μm) | Sintering aid particle size D50 (μm) |
|---|---|---|---|---|---|---|---|
| | $Al_2O_3$ (wt. %) | $SiO_2$ (wt. %) | CaO (wt. %) | MgO (wt. %) | $La_2O_3$ (wt. %) | | |
| Comp. Ex. 1 | 96.0 | 2.0 | 1.8 | 0.2 | 0.0 | — | 3.4 |
| Comp. Ex. 2 | 96.0 | 2.0 | 1.8 | 0.2 | 0.0 | — | 1.5 |
| Comp. Ex. 3 | 91.0 | 2.0 | 1.8 | 0.2 | 5.0 | 2.0 | 1.5 |
| Comp. Ex. 4 | 92.0 | 2.0 | 1.8 | 0.2 | 4.0 | 3.5 | 0.3 |
| Example 1 | 95.8 | 2.0 | 1.8 | 0.2 | 0.2 | 2.0 | 1.5 |
| Example 2 | 95.0 | 2.0 | 1.8 | 0.2 | 1.0 | 0.3 | 1.5 |
| Example 3 | 94.0 | 2.0 | 1.8 | 0.2 | 2.0 | 2.0 | 1.5 |
| Example 4 | 93.0 | 2.0 | 1.8 | 0.2 | 3.0 | 2.3 | 1.5 |
| Example 5 | 92.0 | 2.0 | 1.8 | 0.2 | 4.0 | 2.0 | 1.5 |
| Example 6 | 95.0 | 2.0 | 1.8 | 0.2 | 1.0 | 2.0 | 2.0 |
| Example 7 | 95.0 | 2.0 | 1.8 | 0.2 | 1.0 | 0.5 | 0.5 |
| Example 8 | 95.0 | 2.0 | 1.8 | 0.2 | 1.0 | 0.5 | 0.5 |
| Example 9 | 95.8 | 2.0 | 1.8 | 0.2 | 0.2 | 1.5 | 1.5 |

The prepared samples were measured for relative density, which is used to check denseness of a sintered body, the grain size of a non-vitreous substance, and mechanical strength at room temperature and high temperature and were checked if a magnesium component was present in the non-vitreous substance.

The grain size of a non-vitreous substance was measured through observation of an image of composition or EDS analysis under a scanning electron microscope (model JSM-6460LA, product of JEOL Ltd.). A non-vitreous substance was identified by an energy dispersion method (X-ray diffraction). The measurement was carried out by means of an energy-dispersive X-ray analyzer (model EX-23000BU) attached to the SEM under the following conditions: X-ray: Kα ray; acceleration voltage: 20 kV; and cumulative count: 100. FIG. 1(a) shows an EDS image of the sintered body of Comparative Example 1; FIG. 1(b) shows an EDS image of the sintered body of Example 3; FIG. 2(a) shows an SEM image of the sintered body of Comparative Example 3; and FIG. 2(b) shows an SEM image of the sintered body of Example 6.

Whether or not a magnesium component is present in a non-vitreous substance can be confirmed through elemental analysis conducted under the following measuring conditions by means of an energy-dispersive X-ray analyzer (EDX) (EDX: Genesis 4000 and detector: SUTW3.3RTEM, products of EDAX) attached to the transmission electron microscope (HD-2000, product of HITACHI).

Measuring Conditions
(1) Acceleration voltage: 200 kV
(2) Irradiation mode: HR (spot size: approx. 0.3 nm)

The relative density of a sintered body was measured through the Archimedean method and was the ratio, expressed in percentage, of the density of a sintered body to the theoretical density calculated from physical properties of the oxides. The upper limit of the relative density of a sintered body is 100%. The greater the relative density, the denser the yielded sintered body.

The sintered body was evaluated on the basis of strength measured by subjecting a test piece to a 3-point bending test at a temperature of room temperature and 800° C. In order to

TABLE 2

| Test piece | Relative density (%) | Non-vitreous substance grain size (μm) | | Presence of Mg in non-vitreous substance | Mechanical strength (MPa) | |
|---|---|---|---|---|---|---|
| | | Average (D50) | Greatest | | Room temp. | 800° C. |
| Comp. Ex. 1 | 96.0 | 3 | 15 | No | 320 | 160 |
| Comp. Ex. 2 | 96.5 | 1 | 5 | No | 400 | 190 |
| Comp. Ex. 3 | 95.2 | 8 | 15 | Yes | 340 | 180 |
| Comp. Ex. 4 | 95.8 | 5 | 12 | Yes | 330 | 180 |
| Example 1 | 96.5 | 1 | 5 | Yes | 460 | 240 |
| Example 2 | 96.4 | 1 | 5 | No | 430 | 210 |
| Example 3 | 96.4 | 2 | 6 | Yes | 450 | 240 |
| Example 4 | 96.3 | 3 | 7 | No | 440 | 210 |
| Example 5 | 96.0 | 5 | 10 | Yes | 430 | 250 |
| Example 6 | 96.0 | 3 | 7 | Yes | 450 | 230 |
| Example 7 | 96.6 | 1 | 5 | Yes | 460 | 250 |
| Example 8 | 96.6 | 0.2 | 5 | Yes | 460 | 250 |
| Example 9 | 95.5 | 0.1 | 2 | Yes | 410 | 200 |

The sintered body of Comparative Example 1 contained a rare earth element oxide in an amount falling outside a range of 0.2 mass % to 4 mass % and also contained a non-vitreous substance having a greatest grain size in excess of 10 μm. The sintered body of Comparative Example 1 was lower in mechanical strength at room temperature and high temperature as compared with those of "Examples," since cracking was apt to occur in the sintered body, starting from a non-vitreous substance having a large grain size. The sintered body of Comparative Example 2 contained a rare earth element oxide in an amount falling outside a range of 0.2 mass % to 4 mass %. The sintered body of Comparative Example 2 was lower in mechanical strength at room temperature and high temperature as compared with those of "Examples." Further, the sintered body of Comparative Example 3 contained a rare earth element oxide in an amount falling outside a range of 0.2 mass % to 4 mass % and also contained a non-vitreous substance having an average grain size in excess of 5 μm and a greatest grain size in excess of 10 μm. The sintered body of Comparative Example 3 was lower in strength at room temperature and high temperature as compared with those of "Examples." The sintered body of Comparative Example 4 contained a non-vitreous substance having a greatest grain size in excess of 10 μm. The sintered body of Comparative Example 4 was lower in strength at room temperature and high temperature as compared with those of "Examples." Also, since the sintered body of Comparative Example 4 was sintered by use of a sintering aid having an average particle size falling outside a range of 0.5 μm to 2 μm, a drop in strength was greater as compared with the case of "Examples."

When the average grain size of a non-vitreous substance exceeds 5 μm, the greatest grain size also increases. An increase in the average grain size and the greatest grain size of a non-vitreous substance increases the possibility of the occurrence and progress of cracking with a non-vitreous substance having large grain size serving as a starting point of cracking. As in the case of Example 8, when the average grain size of a non-vitreous substance was 0.2 μm, mechanical strength at room temperature and that at high temperature were high.

In Example 2, a non-vitreous substance does not contain a magnesium component; thus, Example 2 was slightly lower in strength at high temperature as compared with Example 6, whose composition is relatively close to that of Example 2. Similarly, in Example 4, a non-vitreous substance does not contain a magnesium component; thus, Example 4 was slightly lower in strength at high temperature as compared with Examples 5 and 6, whose compositions are relatively close to that of Example 4. In Example 9, the average grain size of a non-vitreous substance is less than 0.2 μm; thus, Example 9 was slightly lower in relative density and strength at room temperature and high temperature as compared with Example 8, whose composition is relatively close to that of Example 9 and in which the average grain size of a non-vitreous substance is 0.2 μm.

The alumina-based sintered body for a spark plug according to the present invention, i.e., the sintered body which contains alumina in an amount of 90 mass % to 98 mass % and a rare earth element oxide in an amount of 0.2 mass % to 4 mass %, the balance being a sintering aid and in which a non-vitreous substance present in the grain boundary has an average grain size of 5 μm or less and a greatest grain size of 10 μm or less, has proved to have high strength in measurement of strength. A sintered body having a measured strength in excess of 400 MPa can be said to have sufficiently enhanced strength. For example, an insulator was formed from ceramics whose composition was similar to that of a test piece having a measured strength in excess of 400 MPa; by use of the insulator, a spark plug of M10 Bi-HEX in long-reach shape was manufactured; and the spark plug underwent an impact resistance test (according to Section 6.4 in JIS B 8031) and proved to be free from breakage. The alumina-based sintered body for a spark plug according to the present invention can be said to be excellent in mechanical strength, not only bending strength but also impact resistance.

In recent years, a trend to reduce the size of a spark plug is continuing. Thus, a reduction in wall thickness is required of an insulator of a spark plug. By means of using, as an insulator, the alumina-based sintered body for a spark plug according to the present invention, there can be yielded a spark plug having an insulator excellent in mechanical strength.

The invention claimed is:

1. An alumina-based sintered body for a spark plug comprised of:
   alumina, a rare earth element oxide, and an oxide of the same metal as that contained in a sintering aid,
   wherein the alumina-based sintered body contains alumina in an amount of 90 mass % to 98 mass % and the rare earth element oxide in an amount of 0.2 mass % to 4 mass %, the balance being the oxide of the same metal as that contained in the sintering aid such that the alumina content, the rare earth element oxide content, and the content of the oxide of the same metal as that contained in the sintering aid is adjusted to 100 mass %, and
   a non-vitreous substance present in the grain boundary has an average grain size of 5 μm or less and a greatest grain size within a range between 2 μm or more and 10 μm or less.

2. An alumina-based sintered body for a spark plug according to claim 1, wherein the non-vitreous substance present in the grain boundary has an average grain size of 0.2 μm to 5 μm.

3. An alumina-based sintered body for a spark plug according to claim 1 or 2, wherein the non-vitreous substance contains at least a magnesium component.

4. An alumina-based sintered body for a spark plug according to claim 1 or 2, wherein the rare earth element oxide is a lanthanoid oxide, and the oxide of the same metal as that contained in the sintering aid is an oxide of at least one metal selected from the group consisting of silicon, calcium, magnesium, and barium.

5. A spark plug comprising an alumina-based sintered body for a spark plug as recited in claim 1 or 2 and formed into a cylindrical body, a center electrode assembled into the cylindrical body, and a cylindrical metallic shell having the alumina-based sintered body for a spark plug attached thereto.

6. A method of manufacturing an alumina-based sintered body for a spark plug as recited in claim 2, comprising sintering a green compact which contains alumina in an amount of 90 mass % to 98 mass % and a rare earth element oxide in an amount of 0.2 mass % to 4 mass %, the balance being a sintering aid having an average particle size of 0.5 μm≦D50≦2 μm such that the alumina content, the rare earth element oxide content, and the content of the sintering aid is adjusted to 100 mass %.

7. A method of manufacturing an alumina-based sintered body for a spark plug as recited in claim 3, comprising sintering a green compact which contains alumina in an amount of 90 mass % to 98 mass % and a rare earth element oxide having an average particle size of 0.5 μm≦D50≦2 μm in an amount of 0.2 mass % to 4 mass %, the balance being a sintering aid containing at least a magnesium compound and having an average particle size of 0.5 μm≦D50≦2 μm such that the alumina content, the rare earth element oxide content, and the sintering aid content is adjusted to 100 mass %.

8. A method of manufacturing a spark plug as recited in claim 5, comprising:
   firing to sinter a green compact for forming an alumina-based sintered body for a spark plug in a form of a substantially cylindrical body, the green compact containing alumina in an amount of 90 mass % to 98 mass % and a rare earth element oxide in an amount of 0.2 mass % to 4 mass %, the balance being a sintering aid having an average particle size of 0.5 μm≦D50≦2 μm such that the alumina content, the rare earth element oxide content, and the content of the sintering aid is adjusted to 100 mass %;

assembling the center electrode into the substantially cylindrical body of the alumina-based sintered body for a spark plug; and attaching the alumina-based sintered body for a spark plug to the metallic shell.

9. A method of manufacturing a spark plug as recited in claim 5, comprising:

firing to sinter a green compact for forming an alumina-based sintered body for a spark plug in a form of a substantially cylindrical body, the green compact containing alumina in an amount of 90 mass % to 98 mass % and a rare earth element oxide having an average particle size of $0.5\ \mu m \leqq D50 \leqq 2\ \mu m$ in an amount of 0.2 mass % to 4 mass %, the balance being a sintering aid containing at least a magnesium compound and having an average particle size of $0.5\ \mu m \leqq D50 \leqq 2\ \mu m$ such that the alumina content, the rare earth element oxide content, and the sintering aid content is adjusted to 100 mass %;

assembling the center electrode into the substantially cylindrical body of the alumina-based sintered body for a spark plug; and attaching the alumina-based sintered body for a spark plug to the metallic shell.

* * * * *